Nov. 1, 1932.  C. A. SAWTELLE  1,885,552
HYDRAULIC BRAKE CONTROL MECHANISM
Filed July 8, 1929    2 Sheets-Sheet 1
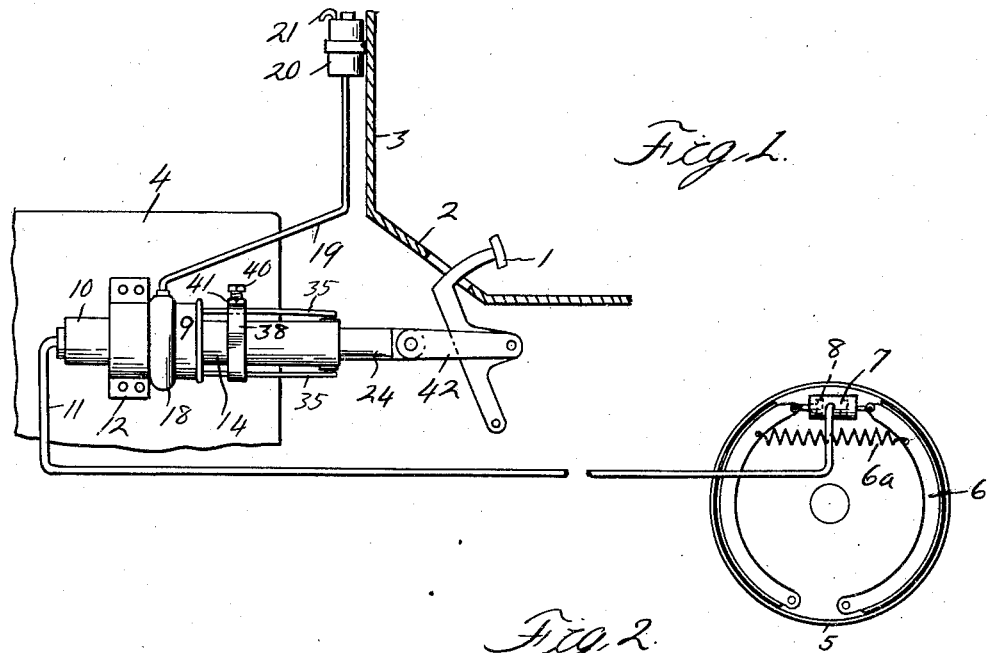
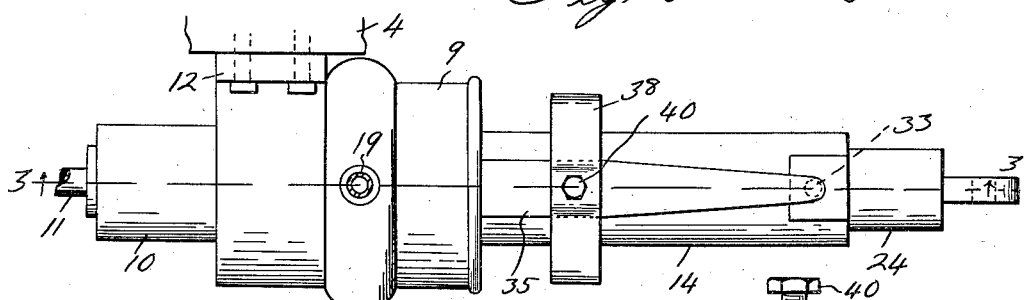
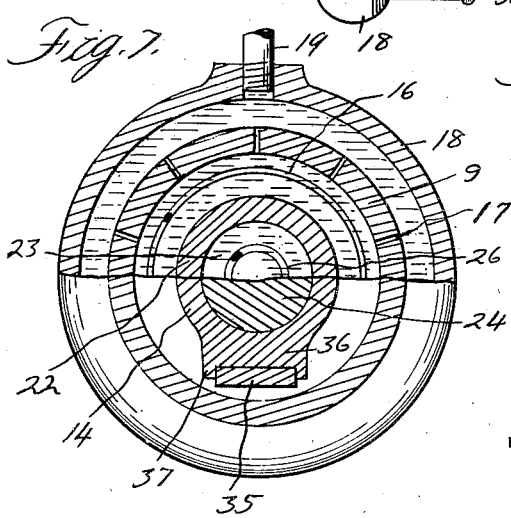
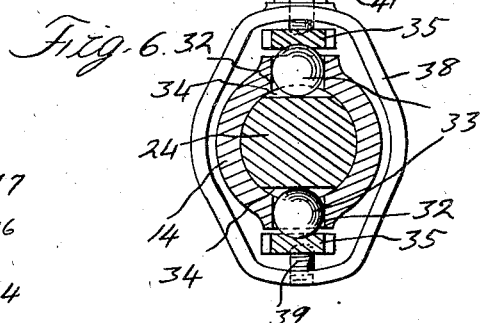
INVENTOR
Charles A. Sawtelle
BY
ATTORNEY

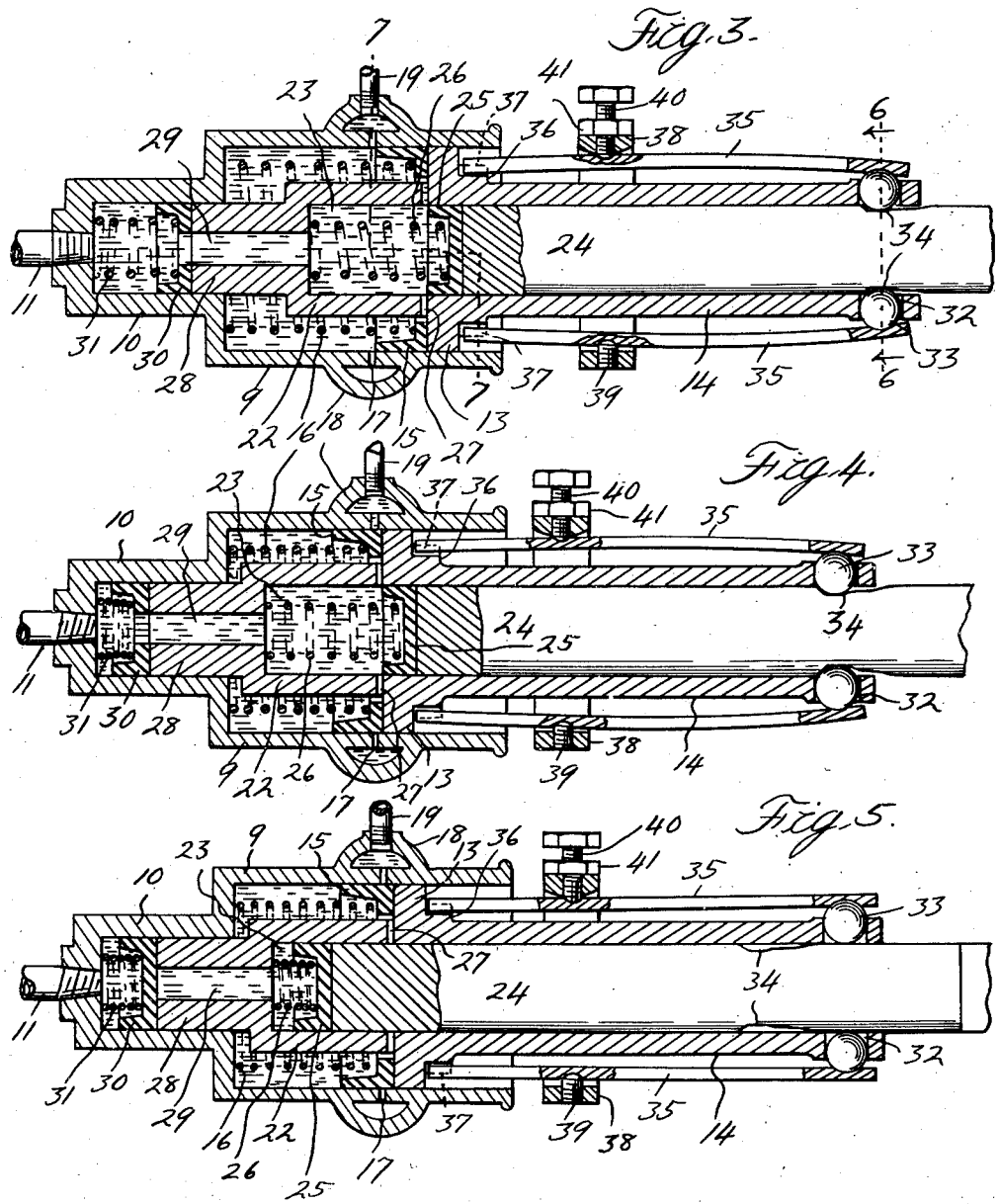

Patented Nov. 1, 1932

1,885,552

UNITED STATES PATENT OFFICE

CHARLES A. SAWTELLE, OF DETROIT, MICHIGAN, ASSIGNOR, BY DIRECT AND MESNE ASSIGNMENTS, TO S. AND D. ENGINEERING COMPANY, OF DETROIT, MICHIGAN, A CORPORATION OF MICHIGAN

HYDRAULIC BRAKE CONTROL MECHANISM

Application filed July 8, 1929. Serial No. 376,546.

This invention relates to hydraulic control mechanisms, and particularly to mechanisms for hydraulically applying brakes.

In applying vehicle brakes, a certain amount of lost motion must be initially taken up, and the shoes or bands of the brakes must be advanced to engage the drum before the actual braking application takes place. There are also various other mechanisms, the operation of which involves a certain amount of relatively free movement preliminary to application of the working load. It is necessary in brake control and various other mechanisms to derive a considerable mechanical advantage, so that a powerful braking (or other) pressure may be applied, responsive to a moderate muscular effort, but the permissible travel of the brake lever pedal or other initially acting control element is limited. It is desirable, therefore, to minimize that initial travel of said pedal which merely takes up lost motion and clearance between the shoe or band and brake drum, so that a maximum of the permissible travel of said pedal may be utilized to derive a mechanical advantage in actually applying the brake. In other words, the magnitude of the mechanical advantage under which actual braking pressure is applied is dependent on the magnitude of travel afforded the braking foot lever or other control element after the taking up of lost and other free motion.

It is an object of the present invention to minimize the preliminary free travel of a foot lever or other control element for a hydraulic braking system by connecting two pistons to said lever, one acting in a relatively large cylinder and inducing a relatively rapid flow of the liquid braking medium and the other acting in a smaller cylinder to induce a more gradual flow of said medium under increased pressure.

Another object is to automatically break the effective connection from said lever to the piston acting in the larger cylinder responsive to increased resistance arising when preliminary free motion has been taken up and, at such time, to automatically connect the piston in the smaller cylinder operatively to said lever.

A further object is to mount two pistons for reciprocation, one within the other, for applying pressure to the liquid medium of a hydraulic brake or other mechanism, to so yieldably connect said pistons as to compel their travel in unison, prior to actual application of the brake (or other load), and to adapt the inner piston to undergo a final travel independently of the outer one for applying a relatively high pressure during actual braking.

Still another object is to provide for a flow of liquid under pressure of said relatively large piston through the cylinder in which the smaller piston is mounted, to the same outlet by which the contents of said cylinder are discharged when the smaller piston is independently actuated.

A still further object is to subject the liquid medium of a hydraulic vehicle brake system to a gravity-induced pressure for the purpose of maintaining a liquid-full condition of the system under all working conditions.

It is also an object to provide for regulation of the pressure applied to yieldably connect the two described differential pistons for travel in unison.

These and various other objects the invention accomplishes by the construction hereinafter described and illustrated in the accompanying drawings, wherein:

Fig. 1 is a diagrammatic view in side elevation of the herein described control mechanism applied to the control of a vehicle brake.

Fig. 2 is a top view of a unit through which differential pressures are applicable to a liquid braking medium by a foot lever.

Fig. 3 is a vertical axial sectional view of said unit taken on the line 3—3 of Fig. 2, showing the normal or non-applied positions of the parts.

Fig. 4 is a similar section, showing the positions of the parts after completion of the travel of the relatively large piston.

Fig. 5 is a similar view, showing the positions of the parts during actual braking, the smaller piston having completed its travel.

Fig. 6 is a cross sectional view, taken upon the line 6—6 of Fig. 3.

Fig. 7 is another cross sectional view, taken upon the line 7—7 of Fig. 3.

In these views, the reference character 1 designates a brake-operating foot lever of a vehicle, 2 the inclined floor board through which said lever works, 3 the dash, 4 the vehicle engine, 5 one of the rear brake drums, 6 brake shoes (or the like) interiorly engageable with said drum and 6a a spring normally retracting said shoes. A hydraulic motor 7 of any desired construction expansively actuates the shoes 6, the illustrated motor comprising a cylinder and a pair of pistons 8 movable from each other therein under liquid pressure.

The unit through which the braking pressure is controlled comprises a cylinder 9 open at its rear end and having a relatively small cylinder 10 opening into and projecting centrally from its forward end, the closed forward end of the latter cylinder being connected by a suitable pipe 11 to the motor 7. Said unit is supported forwardly (or rearwardly) of the foot lever 1 in any suitable manner, as by a bracket 12 attaching said unit to the rear portion of the engine 4.

Reciprocable in the cylinder 9 is a piston 13 having integral therewith or otherwise rigidly carried thereby a coaxial sleeve 14 rearwardly projecting through the open end of said cylinder. Against the front face of said piston seats a flexible sealing member 15 annularly flanged against the cylinder wall and held against said piston by a light coiled spring 16. Normally said piston occupies the rear portion of the cylinder 9, uncovering a plurality of ports 17 opening into said cylinder from a duct 18 extending around said cylinder integrally therewith. A pipe 19 opening into said duct leads to a reservoir 20 secured to the dash 3 at an elevation suitable to subject the liquid contents of the duct 18 to a certain head of pressure. Said reservoir is vented at its top, preferably through a short pipe 21 rising from said top and downwardly bent to exclude dust and dirt.

The piston 13 is formed with a forward extension 22 of less diameter than said piston, forming a cylinder 23 which continuously extends through said piston and the sleeve 14. Slidable in the cylinder 23 is a plunger 24 rearwardly projecting from the sleeve 14 and having a flexible cupped sealing member 25 seated against its forward end under pressure of a light coiled spring 26. Normally said plunger is retracted, as appears in Fig. 3, its forward end lying within the piston 13 and uncovering a series of ports 27 in the extension 22 connecting the cylinders 9 and 23 just in front of the piston 13.

The cylinder-forming extension 22 carries a further forward extension 28 likewise coaxial with the piston 13 and having the nature of a plunger equal in diameter to the plunger 24 and working in the cylinder 10. A passage 29 extends from the cylinder 23 centrally through the extension 28 and opens into the cylinder 10, and a flexible, cupped sealing member 30 surrounding said passage engages the end face of said plunger under pressure of a light coiled spring 31.

The rear end of the sleeve 14 is formed with a pair of diametrically opposed openings 32 receiving a pair of ball detents 33 which normally engage in a pair of notches 34 formed in the plunger 24 at opposite sides thereof. Said notches have beveled front walls and have their rear walls inclined at quite acute angles to the side faces of the plunger 24. A pair of sheet metal leaf springs 35 extend lengthwise of the sleeve 14 at opposite sides thereof, bearing at their rear ends upon detents to urge the latter into the notches 34 under predetermined pressure. The forward ends of the springs 35 seat upon bosses 36 formed on the sleeve 14 close adjacent to the piston 13, and pairs of lugs 37 radially formed on said bosses hold said springs from circumferential shifting.

To regulably stress the springs 35, a collar 38 surrounding the sleeve 14 is engaged with said springs between their mid points and forward ends. Said springs extend through said collar, and one thereof is indented for engagement by a pin 39, projecting radially inward from said collar. The other of said springs is engaged by a set screw 40 radially carried by the collar and adapted to be held variously adjusted in the collar by a lock nut 41.

The rear end of the plunger 24 is connected by a pair of links 42 to an intermediate point of the foot lever 1 so as to be forwardly actuable by a corresponding swinging of said lever.

In the operation of the described mechanism, when the foot lever 1 is actuated, the plunger 24 moves forwardly, and the piston 13 is initially carried with said plunger by the detents 33. Said piston first closes the ports 17 and then displaces liquid from the cylinder 13. The liquid displaced flows through the ports 27 into the cylinder 23 and is discharged through the passage 29 and cylinder 10 to the pipe 11, together with such liquid as is displaced from the cylinder 10 by advance of the plunger 28. Owing to the considerable volume of liquid thus displaced jointly by the piston 13 and plunger 28, such liquid is delivered to the pipe 11 quite rapidy but under only moderate pressure. It follows that only a slight initial actuation of the foot lever is sufficiently effective upon the motor 7 to take up any ordinary lost motion in the brakes and engage the shoes 6 with the drum 5.

Such engagement being established, continued actuation of the foot lever 1 meets with a largely increased resistance, transmitted through the liquid medium, and such resistance acts through the piston 13 and sleeve 14 upon the detents 33 to dislodge the latter from the notches 34, the springs 35 flexing outwardly to permit such dislodgment. The plunger 24 now advances in the cylinder 23 responsive to continued actuation of the foot lever, acting first to close the ports 27 and to then displace liquid from said cylinder. Since the entire braking effort is now applied solely to advance said plunger, it follows that pressure transmitted through the liquid is largely increased, while the volume of displacement is correspondingly reduced. Thus the lever travel subsequent to taking up of lost and other free motion is productive of a powerful braking pressure.

Upon release of the brake pedal the spring (or springs) 6a, in retracting the shoes 6, displaces the pistons 8 of the motor toward each other, and the liquid is forced back through the pipe 11 acting on the plunger 24 and then on plunger 28 and piston 13 to reestablish the normal positions of all of the parts. Such liquid as was displaced from the cylinder 9 is returned thereto immediately upon uncovering of the ports 27.

The reservoir 20, because of its elevated mounting, acts in the normal or non-braking positions of the parts to maintain a slight head of pressure upon all of the liquid in the system, assuring a liquid-full condition thereof; and also serves to replenish any slight losses due to leakage, and to compensate for such expansion and contraction of said liquid as may result from temperature changes.

The collar 38 engaging the two springs 35 equalizes the resistances offered by said springs to dislodgment of the detents 33 from the notches 34, and the set-screw 40 permits accurate regulation of said resistances to meet various working conditions.

The liquid medium employed in the system is preferably one that will withstand low temperatures without freezing, as for example, glycerine or an alcoholic mixture. The term "hydraulic" as employed in this specification and the appended claims is considered to cover the use of any liquids. Also the term "plunger" is used in a broad sense, not excluding any kind of piston.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. In a liquid pressure appliance, a piston and a plunger coaxial with and of less diameter than said piston, working cylinders receiving said piston and plunger, means for transmitting liquid pressure from said cylinders to a common point, means for actuating said plunger, a sleeve carried by said piston slidably receiving said plunger, a detent member carried by said sleeve, means upon said sleeve acting upon said detent to normally engage said detent with the plunger to actuate the piston from the plunger, said last named means being yieldable responsive to a predetermined liquid resistance opposing travel of said piston to afford the plunger travel relative to the piston.

2. In a liquid pressure appliance, a piston, a plunger of less diameter than said piston, working cylinders receiving said piston and plunger, the plunger cylinder having an outlet port and also having an inlet port opening into the piston cylinder, means for actuating said plunger, and a connection normally adapting the piston for actuation by the plunger, yieldable under predetermined stress to afford the plunger independent travel, said inlet port being positioned for closure by said plunger during its independent travel.

3. In a liquid pressure appliance, a cylinder, a piston working in said cylinder, a cylinder of lesser diameter carried by said piston within said cylinder and formed with a port connecting said cylinders at the pressure side of said piston, a passage leading from the inner cylinder adjacent to one end thereof, a plunger movable in the inner cylinder toward said passage, means for actuating said plunger, and means normally connecting said piston to said plunger for actuation by the latter, yieldable under predetermined stress.

4. In a liquid pressure appliance, a cylinder, a piston working in said cylinder, a cylinder of lesser diameter carried by said piston within the first mentioned cylinder, a plunger working in said inner cylinder, means for transmitting liquid pressure from said cylinders to a common point, means for actuating said plunger, a sleeve carried by said piston extending around said plunger, and a drive connection from said plunger to said sleeve disposed exteriorly of both cylinders, and yieldable under predetermined stress.

5. In a liquid pressure appliance, a liquid receiving cylinder, a second cylinder coaxial with and rigidly carried by the first mentioned cylinder, a piston working in the first mentioned cylinder to displace its liquid contents, a third cylinder carried by said piston, having a passage placing it in communication with the first-mentioned cylinder in advance of said piston, a plunger carried by the third cylinder, working in the second cylinder, and having a passage connecting the second and third cylinders, a plunger working in the third cylinder to displace liquid through the last mentioned passage into the second cylinder, and an actuating connection from the last mentioned plunger to said piston, yieldable under predetermined resistance.

6. In a liquid pressure appliance, a piston, a working cylinder for said piston, having a port adapted to be closed by said piston in the initial portion of its stroke, a reservoir connected to said port, a plunger coaxial with and of less diameter than said piston, a working cylinder receiving said plunger, means for transmitting liquid pressure from said cylinders to a common point, means for actuating said plunger, and a drive connection from said plunger to said piston yieldable under predetermined stress.

7. In a liquid pressure appliance, a liquid-receiving cylinder, a piston working in said cylinder to displace its liquid contents, two coaxial cylinders of relatively small diameter, one exteriorly carried by the first mentioned cylinder, and having an opening for egress of liquid under pressure, and the other carried by said piston in the first mentioned cylinder, and having a lateral opening into the first mentioned cylinder, a plunger working in the cylinder carried by said piston to displace its liquid contents, a sleeve carried by said piston and slidably receiving said plunger, actuating means for said plunger, a drive connection from said plunger to said sleeve yieldable under predetermined stress, and a plunger extending from the cylinder carried by the piston and working in the other small cylinder, and formed with a passage for the flow of liquid from one of said small cylinders to the other.

8. In a liquid pressure appliance, a piston and a plunger coaxial with and of less diameter than said piston, working cylinders receiving said piston and plunger, means for transmitting liquid pressure from said cylinders to a common point, means for actuating said plunger, a sleeve carried by said piston slidably receiving said plunger, a detent member carried by said sleeve, means upon said sleeve acting upon said detent to normally engage said detent with the plunger to actuate the piston from the plunger, said means being yieldable responsive to a predetermined liquid resistance opposing travel of said piston to afford the plunger travel relative to the piston, and means for adjusting the last named means as regards the force applied to the detent so as to permit variation of the predetermined resistance requisite to yielding of the detent.

In testimony whereof I sign this specification.

CHARLES A. SAWTELLE.